United States Patent [19]

Arnold et al.

[11] Patent Number: 4,831,494

[45] Date of Patent: May 16, 1989

[54] MULTILAYER CAPACITOR

[75] Inventors: Allen J. Arnold; Michael E. Bariether, both of LaGrangeville; Shin-Wu Chiang, Hopewell Junction; Hormazdyar M. Dalal, Wappingers Falls; Robert A. Miller, Walden; Frank A. Montegari, Wappingers Falls; James M. Oberschmidt, Stanfordville; David T. Shen, Poughkeepsie, all of N.Y.

[73] Assignee: International Business Machines Corporation, Armonk, N.Y.

[21] Appl. No.: 212,361

[22] Filed: Jun. 27, 1988

[51] Int. Cl.⁴ .................. H01G 1/14; H01G 4/38; H01G 4/10; H05K 7/02
[52] U.S. Cl. .................................. 361/306; 361/321; 361/330; 361/411
[58] Field of Search ............................. 361/328–330, 361/400, 402–404, 411, 306, 321

[56] References Cited

U.S. PATENT DOCUMENTS

| | | | |
|---|---|---|---|
| 3,303,393 | 2/1967 | Hymes et al. | 361/411 |
| 3,398,326 | 8/1968 | Swart et al. | 317/101 |
| 3,448,355 | 6/1969 | Ahearn et al. | 361/306 |
| 3,898,541 | 8/1975 | Weller | 361/321 |
| 3,921,285 | 11/1975 | Krall | 361/411 X |
| 4,349,862 | 9/1982 | Bajorek et al. | 361/401 |
| 4,419,714 | 12/1983 | Locke | 361/321 |
| 4,424,552 | 1/1984 | Marcoux | 361/306 |
| 4,430,690 | 2/1984 | Chance et al. | 361/321 |
| 4,458,294 | 7/1984 | Womack | 361/321 |
| 4,590,537 | 5/1986 | Sakamoto | 361/306 |

FOREIGN PATENT DOCUMENTS 2496970 6/1982 France .............................. 361/321

OTHER PUBLICATIONS

IBM Technical Disclosure Bulletin, vol. 26, No. 12, May 1984, pp. 6595–6597.
IBM Technical Disclosure Bulletin, vol. 26, No. 9, Feb. 1984, p. 4489.
IBM Technical Disclosure Bulletin, vol. 26, No. 10B, Mar. 1984, p. 5325.

Primary Examiner—Donald A. Griffin
Attorney, Agent, or Firm—Ira David Blecker

[57] ABSTRACT

Disclosed is a multilayer capacitor consisting of a plurality of laminae with each of the laminae including a conductive plate portion and a non-conductive sheet portion. The conductive plate portion has at least one tab projecting to at least one edge of the conductive plate portion with the maximum number of tabs per conductive plate portion being limited to avoid excessive lateral congestion. The laminae are divided into different groups with the laminae from each group having the same number and location of tabs and with the laminae from different groups differing by at least the location of the tabs. The laminae are interleaved so that:

(a) a lamina from one group alternates with a lamina from a different group,
(b) the conductive plate portion of each lamina is in contact with the non-conductive sheet portion of each adjacent lamina,
(c) the tabs are at a common edge of each lamina so that the tabs of the interleaved laminae form rows of tabs, and
(d) the tabs from adjacent laminae are not in registry with each other.

The capacitor finally includes islands of metallurgy joining selected groups of tabs in each row such that each of the islands covers a portion of each row of tabs.

49 Claims, 5 Drawing Sheets

MULTILAYER CAPACITOR

BACKGROUND OF THE INVENTION

The present invention concerns multilayer ceramic capacitors having multiple capacitor plates which are terminated at a common face and more particularly, relates to improvements to multilayer capacitors resulting in greater flexibility in use and ease in manufacturing.

The continuing objective of data processing equipment designers is to produce equipment having increased operating speed, reduced physical size and lower manufacturing cost.

Advances in integrated circuit technology have gone a long way to satisfy this objective. One particular area of concentration is the capacitor. In an effort to get ever greater switching speed, circuit designers have gone to a decoupling capacitor which provides a low impedance path across the power supply to power the semiconductor chips without coupling noise into the signal wiring. The noise, if coupled, could cause errors in the computer functions. Such decoupling capacitors are discrete, i.e. separate from the chips. However, to retain the advantages of integrated form, the circuit designers have sought discrete capacitors of small size, maximum capacitance, high speed (rapid responding), low inductance, low resistance and reasonable cost.

The capacitor frequently suggested for use today in this particular application is the multilayer ceramic capacitor. This capacitor consists of a series of parallel plates which are laminated together. Each of these plates consists of a sheet of ceramic dielectric material and a metallic plate. For convenience, the dielectric material may be simply metallized to form each parallel plate. Each of the metallic plates has one or more laterally spaced tabs which may or may not terminate at a common side so as to form longitudinal rows of tabs. Each row of tabs is connected one to the other by a shorting bar or electrode. Final connection of the capacitor to the chips may be conveniently accomplished by surface mounting techniques or, more preferably, by flip-chip mounting the capacitor on a multilayer ceramic substrate with the use of solder balls as disclosed, for example, in Bajorek et al. U.S. Pat. No. 4,349,862, the disclosure of which is incorporated by reference herein. Instead of solder balls, an array of solder bars may be used as disclosed in Chance et al. U.S. Pat. No. 4,430,690, the disclosure of which is incorporated by reference herein.

Other types of multilayer ceramic capacitors are disclosed, for example, in Swart et al. U.S. Pat. No. 3,398,326 and Sakamoto U.S. Pat. No. 4,590,537, the disclosures of which are incorporated by reference herein. In each of these references, the shorting bar or electrode connects all the tabs in each row.

A common characteristic of these multilayer capacitors is that each plate type is assigned to only one voltage and each row of tabs is also assigned to only one voltage. For example, in the IBM Technical Disclosure Bulletin, Vol. 26, No. 12, May 1984 (pp. 6595–6597), it is desired to decouple among four different voltages. Each plate type is assigned to only one voltage and each row of tabs is assigned to only one voltage. More importantly, it is necessary to have eleven laterally spaced tabs to accomplish this result. IBM Technical Disclosure Bulletin, Vol. 26, No. 9, February 1984 (p. 4489) and IBM Technical Disclosure Bulletin, Vol. 26, No. 10B, March 1984 (p. 5325) also illustrate the lateral congestion encountered in these types of capacitors. These last two references also illustrate that the tabs may emerge at two common sides of the capacitor, one side being for connection to the substrate with the other side being used for testing or other purposes. All three of these Technical Disclosure Bulletin references are incorporated by reference herein.

Recognizing the problems inherent in properly aligning the tabs and shorting bars which are only a few thousandths of an inch in width, Locke U.S. Pat. No. 4,419,714, the disclosure of which is incorporated by reference herein, proposed a new method of manufacturing the capacitor to correct for misalignment of the tabs and shorting bars. This method essentially consists of putting in the face of the capacitor to thereby align the tabs or at least eliminate that portion of each tab which is out of alignment.

While the Locke reference provides a way to lessen the problem of lateral congestion, it teaches nothing about eliminating the problem itself. And further, the teaching of Locke is that one plate type may only be assigned to one voltage and each row of tabs may only be assigned to one voltage.

It would be desirable to eliminate the problem of lateral congestion so that solutions such as that proposed in the Locke reference do not need to come into play.

Accordingly, it is an object of the invention to have a capacitor which does not suffer from lateral congestion of the tabs.

It is another object of the invention to have a capacitor which allows for a plurality of assigned voltages so that each row of tabs may be assigned to more than one voltage.

It is still another object of the invention to have a capacitor which is high in speed, reasonable in cost and small in size.

It is yet another object of the invention to have a capacitor which is low in inductance, low in resistance and maximized for capacitance.

These and other objects of the invention will become more apparent after referring to the following description considered in conjunction with the accompanying drawings.

BRIEF SUMMARY OF THE INVENTION

The objects of the invention have been achieved by providing, according to one aspect of the invention, a multilayer capacitor comprising:
- a plurality of laminae, each of said laminae comprising a conductive plate portion and a non-conductive sheet portion;
- said conductive plate portion having at least one tab projecting to at least one edge of the conductive plate portion;
- said laminae divided into different groups with the laminae from each group having the same number and location of tabs and with the laminae from different groups differing by at least the location of the tabs;
- the laminae interleaved so that:
  (a) a lamina from one group alternates with a lamina from a different group,
  (b) the conductive plate portion of each lamina is in contact with the non-conductive sheet portion of each adjacent lamina, (c) the tabs are at a common edge of each lamina so that the tabs of the interleaved laminae form rows of tabs, and (d) the tabs from adjacent laminae are not in registry with each other; and islands of metallurgy joining selected groups of tabs in each row such that each of the islands covers a portion of each row of tabs.

According to a second aspect of the invention, there is provided a multilayer capacitor comprising:

a plurality of laminae, each of said lamina comprising a conductive plate portion and a non-conductive sheet portion;

said conductive plate portion having a plurality of tabs projecting to at least one edge of the conductive plate portion;

said laminae divided into only two different groups with the laminae from each group having the same number and location of tabs and with the laminae from different groups differing by at least the location of the tabs;

the laminae interleaved so that:

(a) a lamina from one group alternates with a lamina from a different group, (b) the conductive plate portion of each lamina is in contact with the non-conductive sheet portion of each adjacent lamina, (c) the tabs are at a common edge of each lamina so that the tabs of the interleaved laminae from rows of tabs, and (d) the tabs from adjacent laminae are not in registry with each other; and islands of metallurgy joining selected groups of tabs in each row such that each of the islands covers a portion of each row of tabs.

According to another aspect of the invention, there is provided an electronic component arrangement comprising:

a ceramic substrate having pads for solder bonding to an electronic component; and a multilayer capacitor comprising:

a plurality of laminae, each of said laminae comprising a conductive plate portion and a non-conductive sheet portion;

said conductive plate portion having at least one tab projecting to at least one edge of the conductive plate portion;

said laminae divided into different groups with the laminae from each group having the same number and location of tabs and with the laminae from different groups differing by at least the location of the tabs;

the laminae interleaved so that:

(a) a lamina from one group alternates with a lamina from a different group, (b) the conductive plate portion of each lamina is in contact with the non-conductive sheet portion of each adjacent lamina, (c) the tabs are at a common edge of each lamina so that the tabs of the interleaved laminae form rows of tabs, and (d) the tabs from adjacent laminae are not in registry with each other; and islands of metallurgy joining selected groups of tabs in each row such that each of the islands covers a portion of each row of tabs; and additional metallurgy on each of the islands for terminating the capacitor to a substrate wherein the additional metallurgy comprises a solder pad covering substantially each of the islands;

wherein the capacitor is joined to the substrate by contacting the pads of the substrate with the solder pad of the capacitor.

There is provided, according to a final aspect of the invention, an electronic component arrangement comprising:

a ceramic substrate having pads for solder bonding to an electronic component; and a multilayer capacitor comprising:

a plurality of laminae, each of said laminae comprising a conductive plate portion and a non-conductive sheet portion;

said conductive plate portion having a plurality of tabs projecting to at least one edge of the conductive plate portion;

said laminae divided into only two different groups with the laminae from each group having the same number and location of tabs and with the laminae from different groups differing by at least the location of the tabs;

the laminae interleaved so that:

(a) a lamina from one group alternates with a lamina from a different group, (b) the conductive plate portion of each lamina is in contact with the non-conductive sheet portion of each adjacent lamina, (c) the tabs are at a common edge of each lamina so that the tabs of the interleaved laminae form rows of tabs, and (d) the tabs from adjacent laminae are not in registry with each other; and islands of metallurgy joining selected groups of tabs in each row such that each of the islands covers a portion of each row of tabs; and additional metallurgy on each of the islands for terminating the capacitor to a substrate wherein the additional metallurgy comprises a solder pad covering substantially each of the islands;

wherein the capacitor is joined to the substrate by contacting the pads of the substrate with the solder pad of the capacitor.

DETAILED DESCRIPTION OF THE INVENTION

Figure 1:
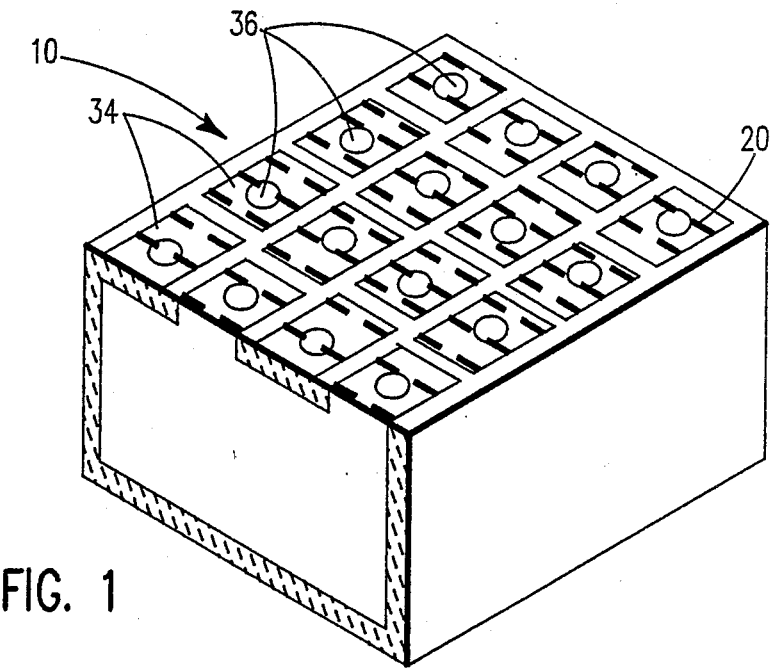
FIG. 1 is a perspective view of a multilayer capacitor according to the invention with the end non-conductive sheet portion removed.
Figure 2:
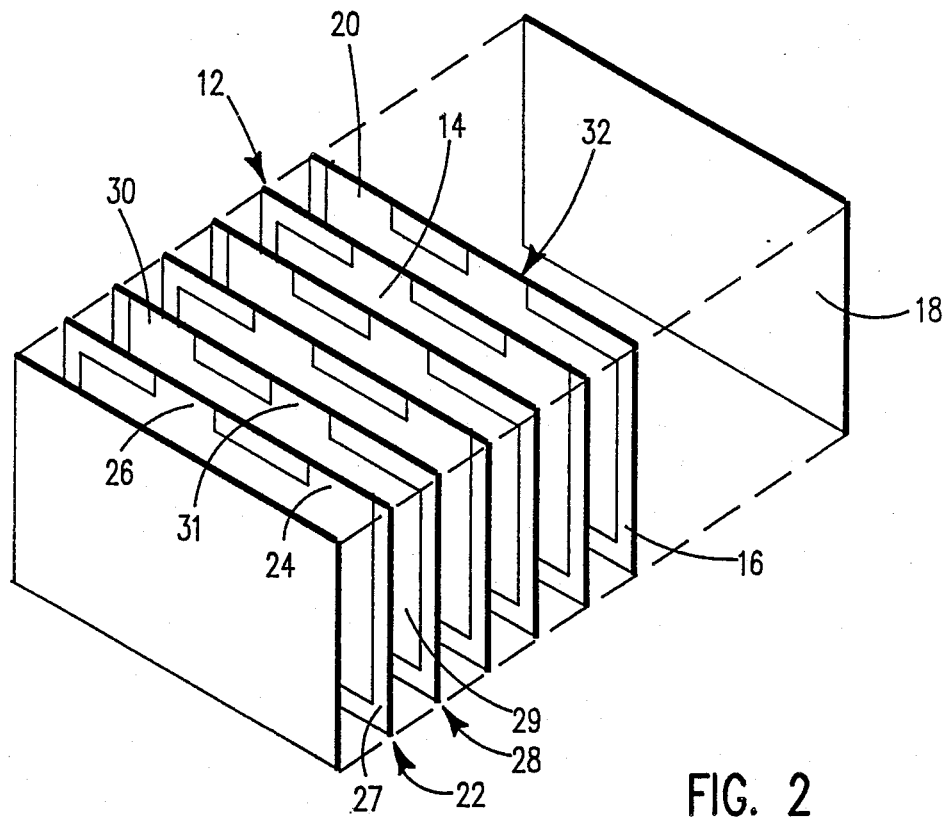
FIG. 2 is an exploded perspective view of the multilayer capacitor of FIG. 1, with the top metallurgy removed.
Figure 3:
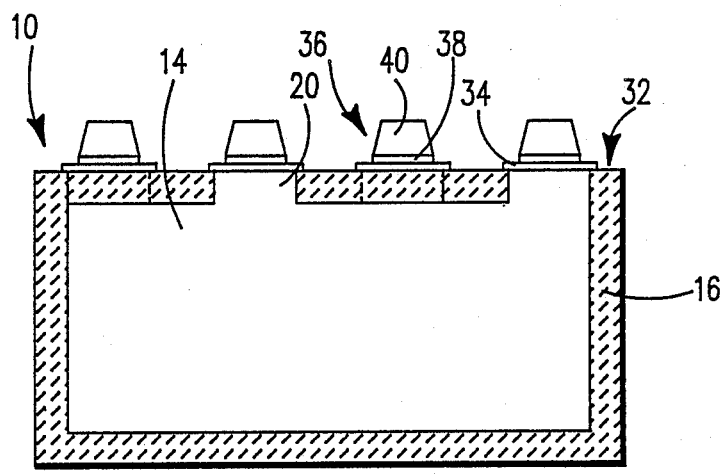
FIG. 3 is a side view of the multilayer capacitor of FIG. 1.

Referring now to the Figures in more detail and particularly referring to FIGS. 1 to 3 there is shown a multilayer capacitor, generally indicated by 10, according to the invention. The multilayer capacitor 10 comprises a plurality of laminae 12 wherein each of the laminae comprises a conductive plate portion 14 and a non-conductive sheet portion 16. At each end of the multilayer capacitor 10 there is at least one non-conductive sheet portion 18 which does not contain a conductive plate portion. There may, of course, be more than one non-conductive sheet portion 18, if desired. The conductive plate portion 14 has at least one tab 20 projecting to at least one surface edge 32 of the conductive plate portion 14 and lamina 12. An important feature of the invention is that the maximum number of tabs 20 per conductive plate portion 14 is limited so as to avoid excessive lateral congestion. The importance of this limitation will become more apparent hereafter.

The laminae 12 are divided into different groups with all the laminae from each group having the same number and location of tabs and with the laminae from different groups differing by at least the location of tabs. That is, specifically referring to FIG. 2, there is one group of laminae represented by lamina 22 wherein the conductive plate portion 14, for example, has a tab 24 to the far right of the conductive plate portion 14 and another tab 26 laterally spaced therefrom. There is a second group of laminae represented by lamina 28 which, for example, has a tab 30 all the way to the far left of the conductive plate portion 14 and another tab 31 spaced laterally therefrom. By comparing the laminae from the group represented by lamina 22 and the laminae from the group represented by lamina 28, it can be seen that the conductive plate portions on each of the non-conductive sheet portions for each of the groups are distinctly different. While only two different groups are illustrated in FIG. 2, there may be three or more different groups as required. The ultimate limit on the number of different groups of laminae is the requirement to avoid excessive lateral congestion of the various tabs.

For purposes of illustration, and not of limitation, all the conductive plate portions in FIG. 2 have two tabs projecting therefrom. There may, in fact, be a number of tabs other than two. It should be understood that all that is required according to the invention is that there be at least one tab projecting from each of the conductive plate portions.

The laminae 12 are interleaved so that a lamina from one group, such as that represented by lamina 22, alternates with a lamina from a different group, such as that represented by lamina 28. The conductive plate portion of each lamina is in contact with the non-conductive sheet portion of each adjacent lamina. Thus, for example, conductive plate portion 29 of lamina 28 is in contact with non-conductive sheet portion 27 of lamina 22. The tabs 20 of each of the laminae 12 are at a common edge 32 of each lamina so that the tabs of the interleaved laminae form rows of tabs as is most apparent from FIG. 1. Finally, the tabs 20 from adjacent laminae are not in registry with each other, as is most apparent from FIG. 3.

The multilayer capacitor 10 further comprises islands of metallurgy 34 joining selective groups of tabs 20 in each row such that each of the islands 34 covers a portion of each row of tabs. It is preferred that the islands 34 cover only a portion of each and every row of tabs. This is most apparent in FIG. 1. Each of the islands 34 is spaced apart from any adjacent island 34. There may be circumstances, however, where it would be desirable to have say one entire row of tabs connected together where the remaining tabs are connected by islands 34. It is thus within the scope of the invention for the islands 34 to cover only a portion of substantially all the rows of the tabs.

Figure 1A:
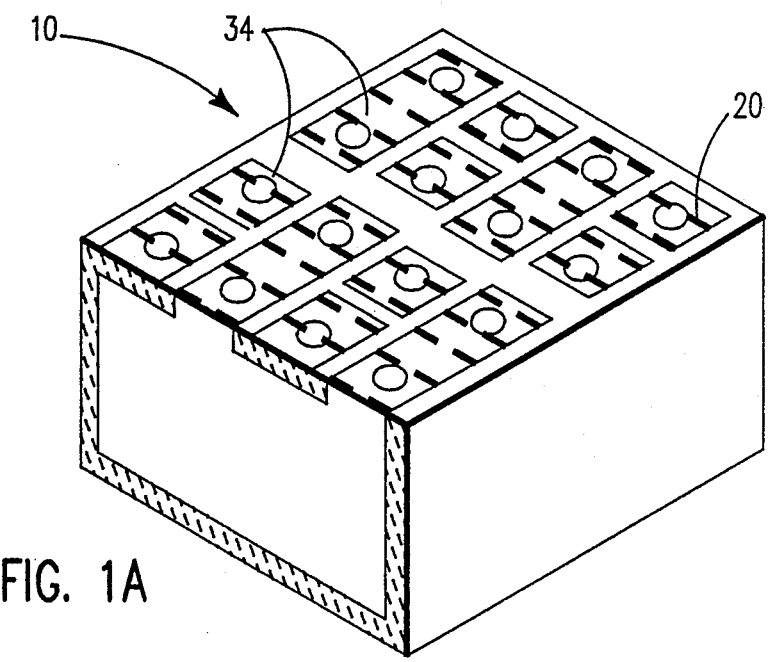
FIG. 1A is a modification of the multilayer capacitor shown in FIG. 1.

FIG. 1A is a modification of the multilayer capacitor of FIG. 1. The principal difference between FIGS. 1 and 1A is that in FIG. 1, equal or near equal groups of tabs have been joined by the islands of metallurgy while in FIG. 1A, partial combination of the groups of tabs has occurred which limits flexibility but allows contact with more plates. The embodiment of FIG. 1A merely illustrates the versatility of the present invention in that the size of the islands can be varied (and hence the number of tabs connected) to suit the design of the system. The embodiment of FIG. 1, is preferred because of its lower inductance. The lower inductance arises because the vertical flow of current into and out of each island alternates direction between any adjacent island. Other variations in the arrangement of the islands can be imagined and these other arrangements are to be considered within the scope of the present invention.

It should be understood that the tabs shown in FIGS. 1 and 1A, while representative of the invention, are schematically illustrated. The actual number of tabs may thus differ from that shown in the Figures.

The importance of having the islands of metallurgy cannot be overemphasized. In the past each row of tabs was only capable of being assigned to one voltage. Now each of the islands 34 along with its selected groups of tabs is now capable of being independently assigned to any particular or predetermined power level.

For example, as shown in FIG. 1, there are sixteen different islands 34. Since each conductive plate portion 1 has two tabs 20 for the purpose of providing redundancy for the multilayer capacitor 10, the capacitor 10 shown in FIG. 1 may be assigned to eight different power levels. This is easily accomplished without the tabs being so close as to cause lateral congestion. If redundancy were not required, then the capacitor 10 could be assigned to sixteen different power levels—all without causing excessive lateral congestion.

Similarly, in FIG. 1A, there are twelve different islands 34. If redundancy were required, the capacitor as shown in FIG. 1A would be assigned to six different power levels. If redundancy were not required, twelve different power levels could be assigned, also without causing excessive lateral congestion.

A distinct advantage of the present invention is that one capacitor fits all potential applications whereas prior art capacitors are specialized for only one particular application.

Another advantage of the present invention, which bears repeating, is the low inductance of the capacitors. For the capacitors of the present invention, inductance is usually less than 100 picohenries.

It is preferred that there be at least two tabs per lamina to provide redundancy. The maximum number of tabs per lamina is limited only by design considerations, manufacturing technology and capacitor size. Suffice it to say here that for the purposes of the present invention, two tabs per lamina is the optimum number of tabs to have. For other applications, more than two tabs per lamina might be required. Such other applications and corresponding changes to the design of the capacitor are considered to be within the scope of the present invention.

It is of course possible that there may be a number of different groups of laminae as alluded to earlier. The various groups of lamina may differ by the lateral spacing of the tabs and/or by the number of tabs per lamina. For example, one group of laminae may have one tab while another group of laminae may have two tabs and yet another group may have three tabs and so on. Each of these groups may be interspersed so as to satisfy the desired redundancy and voltage requirements. It is most preferred however, that there be only two such groups of laminae and that each of these groups have two tabs as shown in FIGS. 1 to 3.

The multilayer capacitor 10 further comprises additional metallurgy generally indicated by 36 on each of the islands 34 for terminating the capacitor 10 to a substrate (not shown). In one embodiment as shown in FIG. 3, the additional metallurgy 36 comprises ball limiting metallurgy 38 and solder or solder balls 40.

Figure 7:
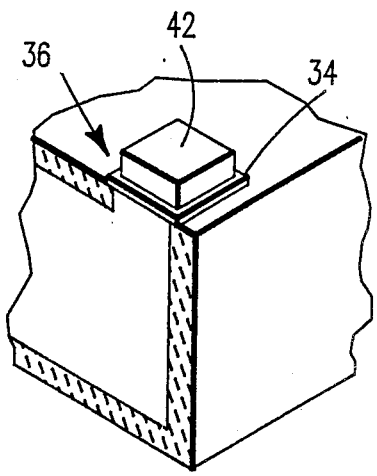
FIG. 7 is an enlarged perspective view of one corner of a multilayer capacitor according to the invention showing further details of the top metallurgy.

Referring to FIG. 7 there is shown an alternative embodiment of the additional metallurgy 36. In this case the additional metallurgy comprises a solder pad 42 which substantially covers each of the islands 34. As shown in FIG. 7 there is only one island 34 but, of course, it is to be understood that there will be a plurality of such islands.

The metallurgy comprising each of the islands of metallurgy 34 may be made from any number of materials which are well known to those skilled in the art. A particularly preferred composition is for there to be layers of chromium (700 Å), copper (4300 Å) then chromium (2000 Å) again. Alternatively, there could be a single layer of chromium (1500 Å). In the embodiment of FIG. 7, it is preferred that the composition for the islands of metallurgy be layers of chromium (700 Å), copper (4300 Å) and gold (1000 Å). For the ball limiting metallurgy 38 it is preferred that it be comprised of layers of chromium (1600 Å), copper (4300 Å) and gold (1000 Å), respectively. If necessary, there may be co-deposited a chromium/copper layer between the chromium and copper layers in the island metallurgy and ball limiting metallurgy. This co-deposited layer aids in the adhesion of the chromium and copper layers.

Figure 4:
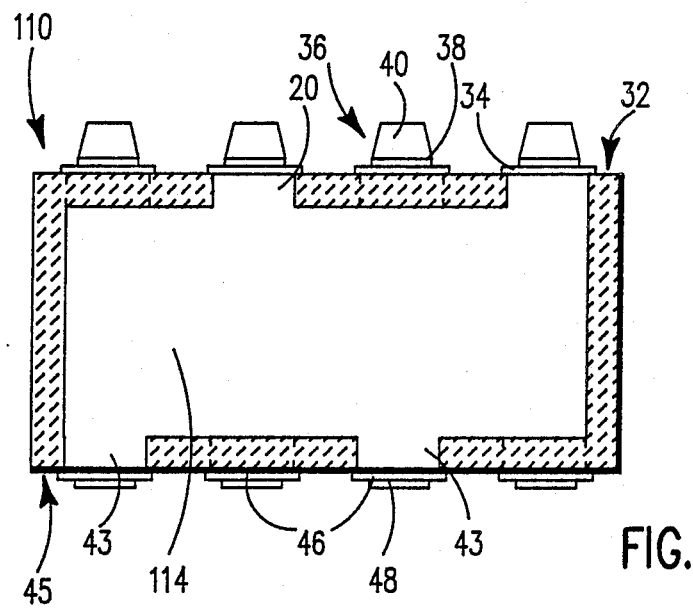
FIG. 4 is a side view of an alternative embodiment of a muitilayer capacitor according to the invention.

Another embodiment of the invention is shown in FIG. 4. Capacitor 110 is substantially similar to capacitor 10 shown in FIGS. 1 to 3 in that capacitor 110 comprises a plurality of laminae having a conductive plate portion and a non-conductive sheet portion, tabs 20 and islands of metallurgy 34. However, capacitor 110 further comprises at least one tab 43 projecting to an opposite edge 45 of each of the conductive plate portions 114. The capacitor 110 further comprises islands of metallurgy 46 which join selected groups of opposed tabs 43.

Figure 4A:
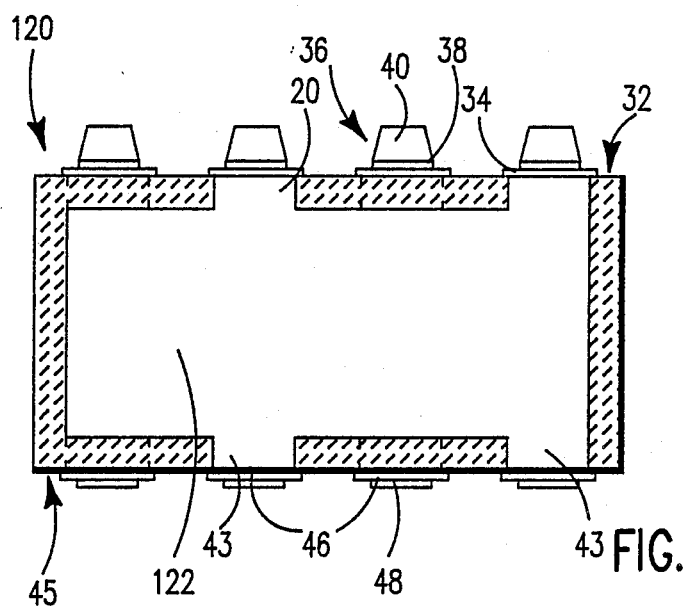
FIG. 4A is a modification of the multilayer capacitor shown in FIG. 4.

FIG. 4A is a modification of capacitor 110 shown in FIG. 4. Capacitor 120 of FIG. 4A also further comprises at least one tab 43 projecting to an opposite edge 45 of each of the conductive plate portions 122. Capacitor 120, however, is configured such that each edge 32, 45 of the conductive plate portion 122 has at least one tab which represents a mirror image of the opposed edge 45, 32 of the conductive plate portion 122. That is, tabs 43 represent a mirror image of tabs 20. With respect to the islands of metallurgy, the islands of metallurgy 34, 46 on opposed sides of the capacitor 110 join mirror-image selected groups of tabs.

The choice of whether to use the embodiment of FIG. 4 or 4A is dictated primarily by manufacturing and assembly concerns. Each of the embodiments offers a particular type of symmetry which those skilled in the art may find useful.

The capacitor 110, 120 may also comprise additional metallurgy on each of the islands 34, 46. For example, the capacitor 110, 120 may comprise an additional metallurgy 36 of ball limiting metallurgy and solder as was discussed previously with respect to FIGS. 1 to 3. In this case by having the additional metallurgy 36 on either side of the capacitor 110, 120 the capacitor may be joined to a substrate without regard to its orientation. That is, the top or bottom of the capacitor 110, 120 may be joined to a substrate. Alternatively, as shown in FIGS. 4 and 4A, only one side of the capacitor 110, 120 has the additional metallurgy 36 for terminating the capacitor to a substrate while additional metallurgy 48 on the opposed side of the capacitor 110, 120 is simply a pad for the placement of a probe for in place testing of the capacitor. Thus, the capacitor 110, 120 may be installed on a substrate using additional metallurgy 36 and, once in place, additional metallurgy 48 may be used for testing of the capacitor 110, 120.

Additional metallurgy may comprise layers of chromium (1600 Å), copper (4300 Å) and gold (1000 Å). A co-deposited layer of chromium/copper between the chromium and copper layers may also be used if desired. Additional metallurgy 48 is preferred if testing of the capacitor 110, 120 is to take place. It is, however, within the scope of the invention for additional metallurgy 48 to be dispensed with and testing may then take place directly upon islands of metallurgy 46.

To obtain the advantages of the invention it is preferred that the thickness of the non-conductive sheet portions 16 between adjacent conductive plate portions 14 is uniform or generally of the same thickness, except that between each of the islands 34 the non-conductive sheet portion 50 should be of an increased thickness. This may be accomplished by placing additional non-conductive sheets between groupings of laminae. The purpose for this limitation is so that adjacent islands are properly insulated from one another. This aspect of the invention is shown in FIG. 5.

Figure 5:
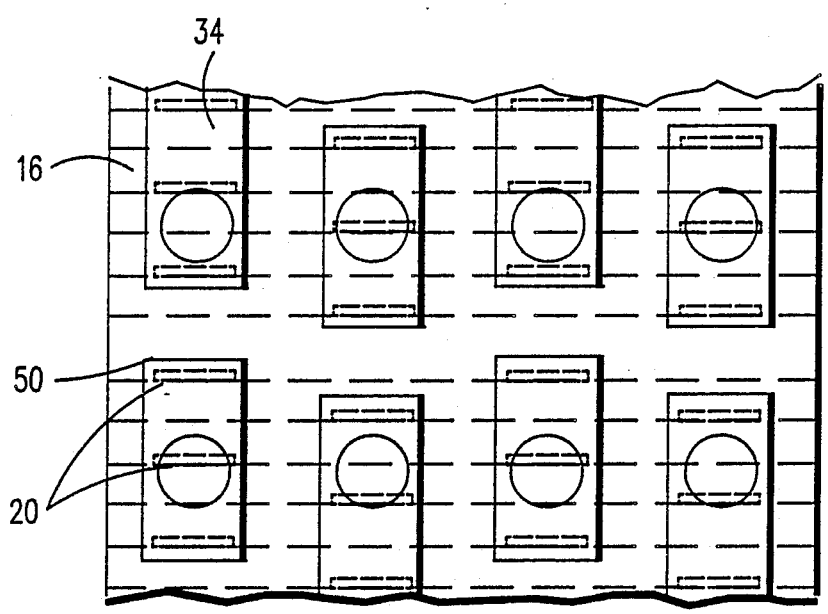
FIG. 5 is an enlarged top view of the multilayer capacitor shown in FIG. 1.

Also shown in FIG. 5 is another interesting aspect of the present invention, to wit, the staggering of the edges of the islands. Progressing across the surface of the capacitor, in a direction generally perpendicular to the rows of tabs, the islands of metallurgy end after contacting the last tab. Consequently, the islands of metallurgy in adjacent rows end at different points, leading to a staggered configuration. In so doing, the maximum number of tabs are contacted by the islands with also the maximum amount of separation between islands in each row.

Figure 6:
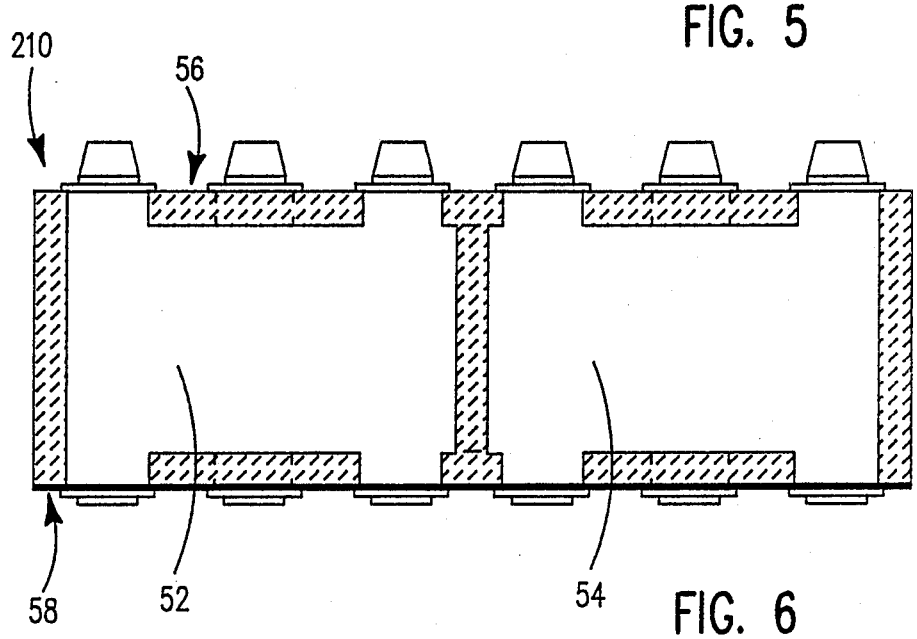
FIG. 6 is a side view of another embodiment of a multilayer capacitor according to the invention.

Another embodiment of the capacitor is shown in FIG. 6. In this embodiment of the capacitor 210, each of the conductive plate portions is divided into separate and distinct segments 52, 54, such that there are a plurality of conductive plate segments for each non-conductive sheet portion 16. Where this occurs, the conductive plate portion is divided into two or more, equal or unequal, segments with each of the segments having at least one tab projecting from a common edge thereof, for example, edge 5.. As shown in FIG. 6, each of the conductive plate portions 52, 54 has two tabs on each conductive plate portion at edge 56. It is preferred that there be at least two tabs so as to provide the necessary or desired redundancy. There may of course be circumstances where such redundancy is not required in which case only one tab per conductive plate portion would be required. Each of the conductive plate portions may further comprise tabs at an opposed edge 58 of the conductive plate portion as discussed previously and as illustrated in FIG. 6. The advantage of breaking up each conductive plate portion into two or more segments provides an additional flexibility in providing the necessary power levels while avoiding excessive lateral congestion of the tabs. In the embodiment shown in FIG. 6, each of the conductive plate portions which is divided into segments is alternated with a conductive plate portion which is not divided into segments. The arrangement shown in FIG. 6 is only one of many possible arrangements. Each of the succeeding conductive plate portions could also have been split. There may also be an arrangement where segmented and non-segmented conductive plate portions are arranged in some predetermined order which has not been shown but is nevertheless contemplated within the scope of the invention. The ultimate arrangement of the laminae depends on the perceived need for simplicity of manufacture and the number of voltages one would like to couple.

Figure 8:
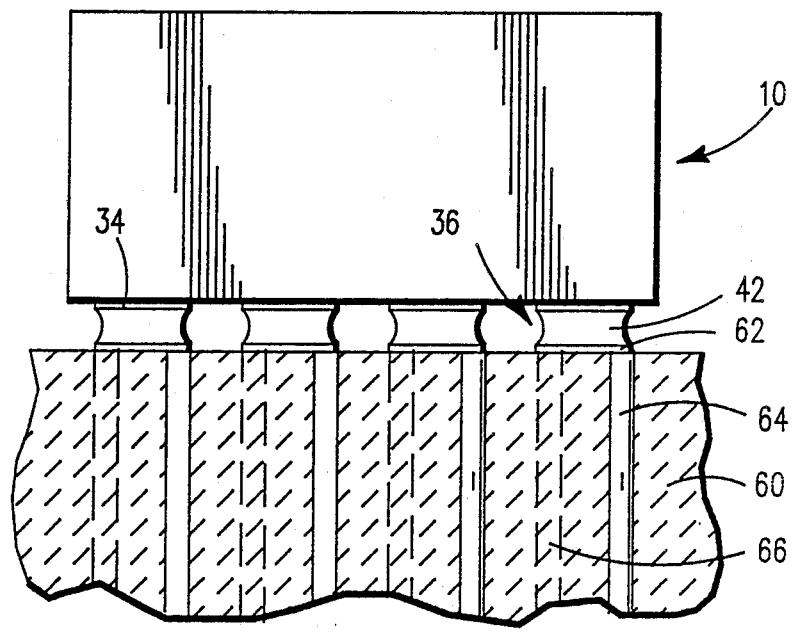
FIG. 8 is a side view in partial cross section showing a multilayer capacitor according to the invention jointed to a substrate.

Referring now to FIG. 8 there is shown a further embodiment of the invention in which a multilayer capacitor 10 is joined to a ceramic substrate 60 to form an electronic component arrangement. While the multilayer capacitor 10 is the one shown in FIGS. 1 to 3, it should be understood that any of the other capacitors which have been previously discussed may be utilized in the embodiment of FIG. 8. The ceramic substrate 60 has pads 62 on its surface for solder bonding to an electronic component which, for purposes of illustration, is the multilayer capacitor 10. The multilayer capacitor as discussed previously has islands of metallurgy 34 which join selective groups of tabs. The multilayer capacitor 10 further comprises additional metallurgy 36 on each of the islands 34 for terminating the capacitor 10 to the substrate 60. The additional metallurgy 36 in this embodiment, however, comprises a solder pad 42 which covers substantially each of the islands 34. As can be appreciated this additional metallurgy 36, i.e. solder pad 42, is identical to that which was discussed with reference to the embodiment of FIG. 7. The capacitor is joined to the substrate 60 by contacting the pads 62 of the substrate 60 with solder pad 22 of the capacitor 10 and then heating so as to melt solder pad 42.

The particular advantage of the embodiment shown in FIG. 8 is that previously where each of the pads 62 on substrate 60 would be connected to a single via in the substrate now, due to the greater contact surface area between the capacitor 10 and the substrate 60 through solder pad 42, each of the pads 62 may now be connected to at least two vias 64 and 66. In conformance with the advantages of the invention discussed previously, the fact that multiple vias may be connected to each pad 62 provides additional redundancy in the substrate wiring thereby enhancing the overall operation of the electronic package.

Such full island terminals are also advantageous as the capacitor tabs feed through, and not along, islands and directly into matching substrate islands, thereby greatly reducing resistance within the interconnection complex. To a somewhat lesser extent, resistance is also reduced where the termination is through the solder balls.

It should be apparent by now that the multilayer capacitor according to the invention may be joined to multilayer ceramic substrates. Joining to the substrate may be by full island terminals, as just discussed, or solder balls. Additionally, the capacitors may be surface mounted with connections made to the substrate by wire bonding. Finally, the capacitors alternatively may be joined to polymeric or organic substrates such as printed circuit boards.

It will be apparent to those skilled in the art having regard to this disclosure that other modifications of this invention beyond those embodiments specifically described here may be made without departing from the spirit of the invention. Accordingly, such modifications are considered within the scope of the invention as limited solely by the appended claims.

We claim:
1. A multilayer capacitor comprising:
   a plurality of laminae, each of said laminae comprising a conductive plate portion and a non-conductive sheet portion;
   said conductive plate portion having at least one tab projecting to at least one edge of the conductive plate portion;
   said laminae divided into different groups with the laminae from each group having the same number and location of tabs and with the laminae from different groups differing by at least the location of the tabs;
   the laminae interleaved so that:
   (a) a lamina from one group alternates with a lamina from a different group,
   (b) the conductive plate portion of each lamina is in contact with the non-conductive sheet portion of each adjacent lamina,
   (c) the tabs are at a common edge of each lamina so that the tabs of the interleaved laminae form rows of tabs, and
   (d) the tabs from adjacent laminae are not in registry with each other; and
   islands of metallurgy joining selected groups of tabs in each row such that each of the islands covers a portion of each row of tabs, each of the islands and selected groups of tabs is capable of being independently assigned to a predetermined power level.

2. The capacitor of claim 1 wherein the maximum number of tabs per conductive plate portion is limited to avoid excessive lateral congestion.

3. The capacitor of claim 1 wherein each of the islands of metallurgy covers only a portion of each and every row of tabs.

4. The capacitor of claim 1 wherein the total number of tabs for each lamina shall be 2 and the total number of tabs for any two adjacent laminae shall be 4.

5. The capacitor of claim 1 wherein the thickness of the non-conductive sheet portions between adjacent conductive plate portions is uniform except that between each of the islands, the non-conductive sheet portion is of increased thickness.

6. The capacitor of claim 1 wherein each of the conductive plate portions is divided into separate and distinct segments such that there are a plurality of conductive plate portion segments for each non-conductive sheet portion.

7. The capacitor of claim 6 wherein the conductive plate portion is divided into 2 equal segments with each of the segments having at least one tab projecting from a common edge thereof.

8. The capacitor of claim 1 further comprising additional metallurgy on each of the islands for terminating the capacitor to a substrate.

9. The capacitor of claim 8 wherein the additional metallurgy comprises ball limiting metallurgy and solder balls.

10. The capacitor of claim 9 wherein the ball limiting metallurgy comprises layers of chromium/copper/gold, respectively.

11. The capacitor of clam 8 wherein the additional metallurgy comprises a solder pad covering substantially each of the islands.

12. The capacitor of claim 11 wherein the islands of metallurgy comprise layers of chromium/copper/gold, respectively.

13. The capacitor of claim 1 wherein the islands of metallurgy comprise layers of chromium/copper/chromium, respectively.

14. The capacitor of claim 1 wherein the islands of metallurgy comprise a layer of chromium.

15. The capacitor of claim 1 further comprising at least one tab projecting to an opposite edge of each of the conductive plate portions.

16. The capacitor of claim 15 further comprising islands of metallurgy joining selected groups of opposed tabs.

17. The capacitor of claim 16 further comprising additional metallurgy on each of the islands wherein the additional metallurgy on one side of the capacitor is for terminating the capacitor to a substrate and the additional metallurgy on the opposed side of the capacitor is for in-place testing of the capacitor.

18. The capacitor of claim 1 further comprising at least one tab projecting to an opposite edge of each of the conductive plate portions such that each edge of the conductive plate portions having at least one tab represents a mirror image of the opposed edge of the conductive plate portions.

19. The capacitor of claim 18 further comprising islands of metallurgy joining selected groups of opposed tabs such that the islands of metallurgy on opposed sides of the capacitor join mirror-image selected groups of tabs.

20. The capacitor of claim 1 wherein the islands of metallurgy in adjacent rows are staggered.

21. The capacitor of claim 1 wherein the capacitor is a decoupling capacitor.

22. A multilayer capacitor comprising:
a plurality of laminae, each of said laminae comprising a conductive plate portion and a non-conductive sheet portion;
said conductive plate portion having a plurality of tabs projecting to at least one edge of the conductive plate portion;
said laminae divided into only two different groups with the laminae from each group having the same number and location of tabs and with the laminae from different groups differing by at least the location of the tabs;
the laminae interleaved so that:
(a) a lamina from one group alternates with a lamina from a different group,
(b) the conductive plate portion of each lamina is in contact with the non-conductive sheet portion of each adjacent lamina,
(c) the tabs are at a common edge of each lamina so that the tabs of the interleaved laminae form rows of tabs, and
(d) the tabs from adjacent laminae are not in registry with each other; and
islands of metallurgy joining selected groups of tabs in each row such that each of the islands covers a portion of each row of tabs.

23. The capacitor of claim 22 wherein the maximum number of tabs per conductive plate portion is limited to avoid excessive lateral congestion.

24. The capacitor of claim 22 wherein each of the islands of metallurgy covers only a portion of each and every row of tabs.

25. The capacitor of claim 22 wherein the total number of tabs for each lamina shall be 2 and the total number of tabs for any two adjacent laminae shall be 4.

26. The capacitor of claim 22 wherein each of the islands and selected groups of tabs is capable of being independently assigned to a predetermined power level.

27. The capacitor of claim 22 wherein the thickness of the non-conductive sheet portions between adjacent conductive plate portions is uniform except that between each of the islands, the non-conductive sheet portion is of increased thickness.

28. The capacitor of claim 22 wherein each of the conductive plate portions is divided into separate and distinct segments such that there are a plurality of conductive plate portion segments for each non-conductive sheet portion.

29. The capacitor of claim 28 wherein the conductive plate portion is divided into 2 equal segments with each of the segments having at least one tab projecting from a common edge thereof.

30. The capacitor of claim 22 further comprising additional metallurgy on each of the islands for terminating the capacitor to a substrate.

31. The capacitor of claim 30 wherein the additional metallurgy comprises ball limiting metallurgy and solder balls.

32. The capacitor of claim 31 wherein the ball limiting metallurgy comprises layers of chromium//copper/gold, respectively.

33. The capacitor of claim 30 wherein the additional metallurgy comprises a solder pad covering substantially each of the islands.

34. The capacitor of claim 33 wherein the islands of metallurgy comprise layers of chromium/copper/gold, respectively.

35. The capacitor of claim 22 wherein the islands of metallurgy comprise layers of chromium/copper/chromium, respectively.

36. The capacitor of claim 22 wherein the islands of metallurgy comprise a layer of chromium.

37. The capacitor of claim 22 further comprising at least one tab projecting to an opposite edge of each of the conductive plate portions.

38. The capacitor of claim 37 further comprising islands of metallurgy joining selected groups of opposed tabs.

39. The capacitor of claim 38 further comprising additional metallurgy on each of the islands wherein the additional metallurgy on one side of the capacitor is for terminating the capacitor to a substrate and the additional metallurgy on the opposed side of the capacitor is for in-place testing of the capacitor.

40. The capacitor of claim further comprising at least one tab projecting to an opposite edge of each of the conductive plate portions such that each edge of the conductive plate portions having at least one tab represents a mirror image of the opposed edge of the conductive plate portions.

41. The capacitor of claim 40 further comprising islands of metallurgy joining selected groups of opposed tabs such that the islands of metallurgy on opposed sides of the: capacitor join mirror-image selected groups of tabs.

42. The capacitor of claim 22 wherein the islands of metallurgy in adjacent rows are staggered.

43. The capacitor of claim 22 wherein the capacitor is a decoupling capacitor.

44. An electronic component arrangement comprising:
   a ceramic substrate having pads for solder bonding to an electronic component; and
   a multilayer capacitor comprising:
      a plurality of laminae, each of said laminae comprising a conductive plate portion and a non-conductive sheet portion;
      said conductive plate portion having at least one tab projecting to at least one edge of the conductive plate portion;
      said laminae divided into different groups with the laminae from each group having the same number and location of tabs and with the laminae from different groups differing by at least the location of the tabs;
      the laminae interleaved so that:
         (a) a lamina from one group alternates with a lamina from a different group,
         (b) the conductive plate portion of each lamina is in contact with the non-conductive sheet portion of each adjacent lamina,
         (c) the tabs are at a common edge of each lamina so that the tabs of the interleaved laminae form rows of tabs, and
         (d) the tabs from adjacent laminae are not in registry with each other; and
      islands of metallurgy joining selected groups of tabs in each row such that each of the islands covers a portion of each row of tabs; and
      additional metallurgy on each of the islands for terminating the capacitor to a substrate wherein the additional metallurgy comprises a solder pad covering substantially each of the islands;
   wherein the capacitor is joined to the substrate by contacting the pads of the substrate with the solder pad of the capacitor.

45. The electronic component arrangement of claim 44 wherein the maximum number of tabs per conductive plate portion is limited to avoid excessive lateral congestion.

46. The electronic component arrangement of claim 44 wherein each of the islands of metallurgy covers only a portion of each and every row of tabs.

47. An electronic component arrangement comprising:
   a ceramic substrate having pads for solder bonding to an electronic component; and
   multilayer capacitor comprising:
      a plurality of laminae, each of said laminae comprising a conductive plate portion and a non-conductive sheet portion;
      said conductive plate portion having a plurality of tabs projecting to at least one edge of the conductive plate portion;
      said laminae divided into only two different groups with the laminae from each group having the same number and location of tabs and with the laminae from different groups differing by at least the location of the tabs;
      the laminae interleaved so that:
         (a) a lamina from one group alternates with a lamina from a different group,
         (b) the conductive plate portion of each lamina is in contact with the non-conductive sheet portion of each adjacent lamina,
         (c) the tabs are at a common edge of each lamina so that the tabs of the interleaved laminae form rows of tabs, and
         (d) the tab from adjacent laminae are not in registry with each other; and
      islands of metallurgy joining selected groups of tabs in each row such that each of the islands covers a portion of each row of tabs; and
      additional metallurgy on each of the islands for terminating the capacitor to a substrate wherein the additional metallurgy comprises a solder pad covering substantially each of the islands;
   wherein the capacitor is joined to the substrate by contacting the pads of the substrate with the solder pad of the capacitor.

48. The electronic component arrangement of claim 47 wherein the maximum number of tabs per conductive plate portion is limited to avoid excessive lateral congestion.

49. The electronic component arrangement of claim 47 wherein each of the islands of metallurgy covers only a portion of each and every row of tabs.

* * * * *